US012087214B2

(12) United States Patent
Kim et al.

(10) Patent No.: US 12,087,214 B2
(45) **Date of Patent: *Sep. 10, 2024**

(54) ELECTROLUMINESCENT DISPLAY PANEL HAVING PIXEL DRIVING CIRCUIT

(71) Applicant: LG Display Co., Ltd., Seoul (KR)

(72) Inventors: Jinyeong Kim, Goyang-si (KR); Hyeonho Son, Goyang-si (KR); Seonghwan Ju, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,542

(22) Filed: Oct. 25, 2023

(65) Prior Publication Data

US 2024/0062712 A1 Feb. 22, 2024

Related U.S. Application Data

(63) Continuation of application No. 17/903,817, filed on Sep. 6, 2022, now Pat. No. 11,837,158, which is a (Continued)

(30) Foreign Application Priority Data

Sep. 29, 2020 (KR) ........................ 10-2020-0127490

(51) Int. Cl.
*G09G 3/32* (2016.01)

(52) U.S. Cl.
CPC ....... *G09G 3/32* (2013.01); *G09G 2300/0443* (2013.01); *G09G 2310/0267* (2013.01); (Continued)

(58) Field of Classification Search
CPC ............. G09G 2300/0443; G09G 3/32; G09G 2310/0267; G09G 2310/0275; G09G 2320/0233
See application file for complete search history.

(56) References Cited

U.S. PATENT DOCUMENTS

| | | | |
|---|---|---|---|
| 7,916,102 | B2 | 3/2011 | Chung et al. |
| 10,839,754 | B2 | 11/2020 | Kim et al. |

(Continued)

FOREIGN PATENT DOCUMENTS

| | | | |
|---|---|---|---|
| CN | 103544917 | A | 1/2014 |
| CN | 109493807 | A | 3/2019 |

(Continued)

OTHER PUBLICATIONS

China National Intellectual Property Administration, Office Action, Chinese Patent Application No. 202110924136.1, Oct. 7, 2023, 17 pages.

(Continued)

*Primary Examiner* — Muhammad N Edun
(74) *Attorney, Agent, or Firm* — Fenwick & West LLP

(57) ABSTRACT

A display panel includes a pixel including sub pixels. The pixel includes a sub pixel area in which the sub pixels are disposed and a common area. The pixel includes a light emitting diode including an anode electrode and a cathode electrode, and the anode electrode is electrically connected to a first power line to which a high potential voltage is supplied. Each of the sub pixels includes a driving element in which a source is connected to a N1 node, a gate is connected to a N2 node, and a drain is connected to a N3 node, a capacitor connected to the N2 node and a N4 node; a N1 switching circuit connected to the N1 node; a N2 switching circuit connected to the N2 node; a N3 switching circuit connected to the N3 node; and a N4 switching circuit connected to the N4 node.

29 Claims, 10 Drawing Sheets

Related U.S. Application Data continuation of application No. 17/386,436, filed on Jul. 27, 2021, now Pat. No. 11,468,828.

(52) U.S. Cl.
CPC ............... *G09G 2310/0275* (2013.01); *G09G 2320/0233* (2013.01)

(56) References Cited

U.S. PATENT DOCUMENTS

| | | | |
|---|---|---|---|
| 10,923,038 | B2 | 2/2021 | Kim et al. |
| 11,341,896 | B2 | 5/2022 | Ko et al. |
| 11,631,364 | B2 | 4/2023 | Ko et al. |
| 2006/0186822 | A1 | 8/2006 | Park |
| 2010/0220038 | A1 | 9/2010 | Chung et al. |
| 2011/0063266 | A1 | 3/2011 | Chung et al. |
| 2014/0111563 | A1 | 4/2014 | Hwang et al. |
| 2018/0175268 | A1 | 6/2018 | Moon et al. |
| 2019/0080652 | A1 | 3/2019 | Kim et al. |
| 2019/0115508 | A1 | 4/2019 | Lin et al. |
| 2020/0152132 | A1 | 5/2020 | Kim et al. |
| 2020/0175911 | A1 | 6/2020 | Ko et al. |
| 2022/0254298 | A1 | 8/2022 | Ko et al. |

FOREIGN PATENT DOCUMENTS

| | | | |
|---|---|---|---|
| CN | 111326100 | A | 6/2020 |
| KR | 10-2010-0097874 | A | 9/2010 |
| KR | 10-2020-0053969 | A | 5/2020 |
| WO | WO 2015/003434 | A1 | 1/2015 |

OTHER PUBLICATIONS

European Patent Office, Extended European Search Report and Opinion, EP Patent Application No. 21188448.1, Jan. 20, 2022, 19 pages.
U.S. Appl. No. 17/386,436, filed Mar. 2, 2022, 12 pages.
U.S. Appl. No. 17/903,817, filed Dec. 29, 2022, 16 pages.

ELECTROLUMINESCENT DISPLAY PANEL HAVING PIXEL DRIVING CIRCUIT

CROSS-REFERENCE TO RELATED APPLICATIONS

This application is a continuation application of U.S. patent application Ser. No. 17/903,817 filed on Sep. 6, 2022, which is a continuation application of U.S. patent application Ser. No. 17/386,436 filed on Jul. 27, 2021 (now U.S. Pat. No. 11,468,828 issued on Oct. 11, 2022), which claims the priority of Korean Patent Application No. 10-2020-0127490 filed on Sep. 29, 2020, in the Korean Intellectual Property Office, the disclosure of which is incorporated herein by reference.

BACKGROUND

Field

The present disclosure relates to an electroluminescent display panel including a pixel driving circuit, and more particularly, to an electroluminescent display panel in which a defective image quality is improved.

Description of the Related Art

As the information technology is developed, a market of a display device which is a connecting medium between users and information is growing. Various forms of communication are actively performed beyond text-centered information transmission between users. As the type of information changes, a performance of a display device which displays information is being developed. Correspondingly, the usage of various types of display devices, such as an electroluminescent display device, a liquid crystal display device, and a quantum dot display device, is being increased. Among them, the electroluminescent display device may be classified into an organic light emitting display device and an inorganic light emitting display device depending on a type of a light emitting diode. Further, the inorganic light emitting display device includes an LED display device.

The organic light emitting display device includes an organic light emitting diode which is a self-emitting device and the LED display device includes a light emitting diode (LED) which is a self-emitting device. In the organic light emitting display device or the LED display device, pixels including light emitting diodes are disposed with a specific pattern and luminance of the pixels is adjusted in accordance with gray scale levels of image data. Each of the pixels includes a driving element (or a driving transistor) which controls a driving current flowing through a light emitting diode in accordance with a gate-source voltage and one or more switching elements (or switching transistors) which program the gate-source voltage of the driving element. Further, the pixel adjusts a display gray scale (or luminance) with an emission amount of the light emitting diode in accordance with the driving current.

Recently, attention and development for the LED display device using an LED which is a light emitting diode including an inorganic layer are being increased. The LED may output a gray scale with higher luminance than the organic light emitting diode and has excellent reliability against heat, moisture, oxygen, and the like.

In order to implement a uniform image quality without differences in luminance and color between pixels, driving characteristics between pixels need to be equal. However, there may be variations in driving characteristics between pixels due to various causes such as process variation. Further, since degradation speed between pixels may vary depending on the driving time of the display device, variation in the driving characteristics of the pixels may occur. Accordingly, the amount of driving current which flows in the light emitting diode varies in accordance with deviations in the driving characteristic between pixels, which may cause irregularity in the image quality.

In order to compensate for driving characteristic variation, pixels apply an internal compensation type pixel driving circuit or an external compensation type pixel driving circuit. Such a pixel driving circuit is implemented by elements such as a driving element, a switching element, and a capacitor which have been described above. The driving characteristics such as the reliability of the pixel driving circuit and deviation of the driving current may vary depending on a connection relationship of the elements which configure the pixel driving circuit and a driving method.

SUMMARY

The driving element or the switching element which has been described above may be implemented by a thin film transistor (hereinafter, simply referred to hereinafter as a transistor). The transistor is implemented by a semiconductor layer, an electrode layer, and a plurality of insulating layers. However, during the process of forming the transistor, the insulating layer may be damaged due to static electricity so that a defective transistor may be generated. This could cause a poor image quality of the electroluminescent display device, specifically, a bright spot defect. Specifically, since the LED display device requires a driving current with high luminance to allow the LED to emit light, the bright spot may cause poor image quality. While direct action may be taken to process equipment to suppress the static electricity, the generation of the static electricity may not be suppressed 100%. Accordingly, a pixel driving circuit needs to be implemented so as not to recognize the static electricity as a defect even though the static electricity is generated. In other words, a pixel driving circuit which may reduce the generation of the bright spot in the display panel is needed.

An object to be achieved by an exemplary embodiment of the present disclosure is to provide an electroluminescent display panel including a pixel driving circuit which may reduce the generation of the bright spot due to the static electricity.

An object to be achieved by an exemplary embodiment of the present disclosure is to provide an electroluminescent display panel with an improved degree of integration by more simply configuring a pixel driving circuit configured by a plurality of transistors.

Objects of the present disclosure are not limited to the above-mentioned objects, and other objects, which are not mentioned above, can be clearly understood by those skilled in the art from the following descriptions.

According to an aspect of the present disclosure, an electroluminescent display panel includes a pixel including sub pixels. The pixel includes a sub pixel area in which the sub pixels are disposed and a common area. The pixel includes a light emitting diode including an anode electrode and a cathode electrode. The anode electrode is electrically connected to a first power line to which a high potential voltage is supplied. Each of the sub pixels includes a driving element in which a source is connected to a N1 node, a gate is connected to a N2 node, and a drain is connected to a N3 node, a capacitor connected to the N2 node and a N4 node; a N1 switching circuit connected to the N1 node; a N2 switching circuit connected to the N2 node; a N3 switching circuit connected to the N3 node; and a N4 switching circuit connected to the N4 node. The light emitting diode is electrically connected between the first power line and the driving element. In this case, the bright spot generated due to the static electricity in the display panel may be reduced.

According to another aspect of the present disclosure, an electroluminescent display panel includes a light emitting diode including an anode and a cathode; and a pixel driving circuit which supplies a driving current to the light emitting diode. The anode is connected to a first power line to which a high potential voltage is supplied. A sub pixel which includes the light emitting diode and the pixel driving circuit further includes: a driving element in which a source is connected to a N1 node, a gate is connected to a N2 node, and a drain is connected to a N3 node, an emission control circuit connected to the anode and the cathode, a capacitor connected to the N2 node and a N4 node; a N2 switching circuit connected to the N2 node; a N3 switching circuit connected to the N3 node; and a N1 switching circuit connected to the N1 node or a N4 switching circuit connected to the N4 node. The N3 node is electrically connected to a second power line to which a low potential voltage is supplied. Accordingly, the bright spot generated due to the static electricity in the display panel may be reduced.

Other detailed matters of the exemplary embodiments are included in the detailed description and the drawings.

According to the exemplary embodiments of the present disclosure, a constant voltage is supplied to an anode of the light emitting diode and a driving current is supplied to a cathode by means of the pixel driving circuit to suppress the defect of the bright spot from being generated in the electroluminescent display panel.

Further, according to the exemplary embodiments of the present disclosure, a transistor connected to an anode and a cathode of the light emitting diode is equipped so that the light emitting diode is suppressed from emitting light during a period other than an emission period and a contrast ratio of the display panel is not degraded.

Further, according to the exemplary embodiments of the present disclosure, sub pixels included in a unit pixel share a part of a pixel driving circuit disposed in the unit pixel so that a size of a non-emission area in the unit pixel is reduced to increase a resolution of the display panel.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE EMBODIMENT

Figure 1:
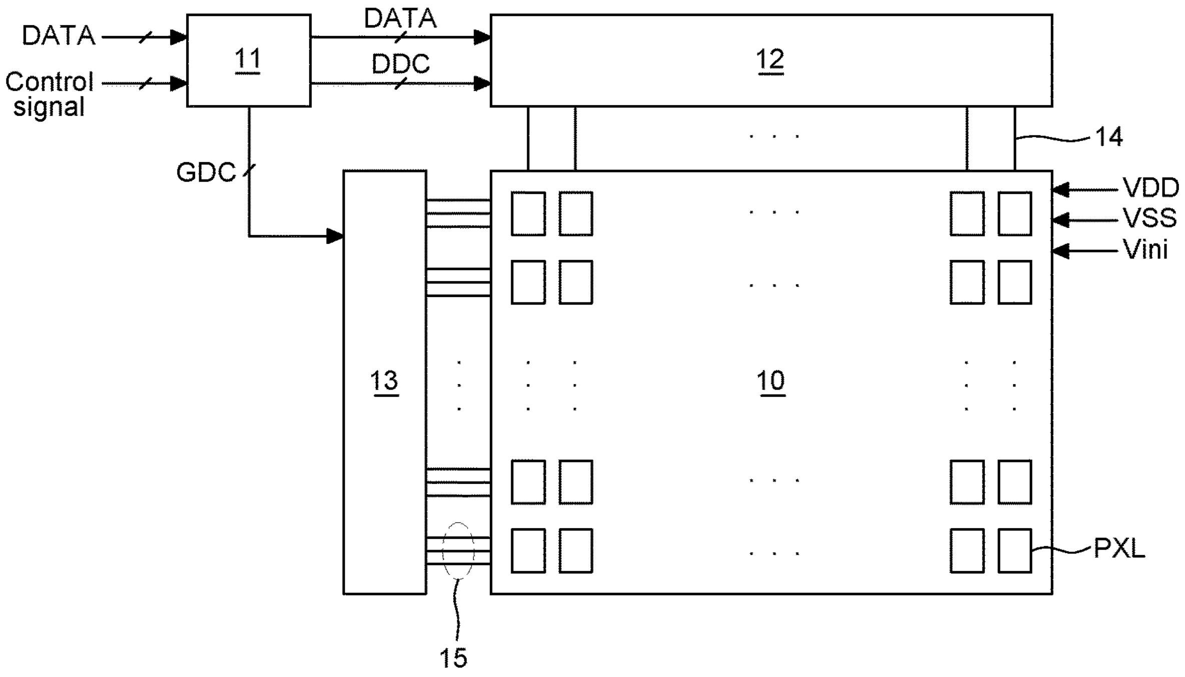
FIG. 1 is a block diagram of an electroluminescent display device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiments disclosed herein but will be implemented in various forms. The exemplary embodiments are provided by way of example only so that those skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as “including,” “having,” and “consist of” used herein are generally intended to allow other components to be added unless the terms are used with the term “only”. Any references to singular may include plural unless expressly stated otherwise.

Components are interpreted to include an ordinary error range even if not expressly stated.

When the position relation between two parts is described using the terms such as “on”, “above”, “below”, and “next”, one or more parts may be positioned between the two parts unless the terms are used with the term “immediately” or “directly”.

When an element or layer is disposed “on” another element or layer, another layer or another element may be interposed directly on the other element or therebetween.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

In the present disclosure, a driving circuit and a gate driving circuit formed on a substrate of a display panel may be implemented by an N-type or a P-type transistor. For example, a transistor may be implemented by a metal oxide semiconductor field effect transistor (MOSFET). A transistor is a three-electrode element including a gate, a source, and a drain. The source is an electrode which supplies carriers to the transistor. In the transistor, the carriers flow from the source to the drain. In the case of the N-type transistor, a carrier is an electron so that the electron moves from the source to the drain and a source voltage is lower than a drain voltage. In the N-type transistor, the electron moves from the source to the drain so that the current is directed to the source from the drain. In the case of the P-type transistor, since the carrier is a hole, the source voltage is higher than the drain voltage so that the hole moves from the source to the drain. The hole of the P-type transistor moves from the source to the drain so that the current is directed to the drain from the source. The source and the drain of the transistor are not fixed, but may be changed by an applied voltage.

Hereinafter, a gate-on signal is a gate signal which turns on the transistor and the gate-off signal is a gate signal which turns off the transistor. In the P-type transistor, the gate-on signal may be a logic low voltage and the gate-off signal may be a logic high voltage. In the N-type transistor, the gate-on signal may be a logic high voltage and the gate-off signal may be a logic low voltage.

Hereinafter, a pixel driving circuit according to an exemplary embodiment of the present disclosure and an electroluminescent display panel including the same will be described with reference to the accompanying drawings.

Figure 2:
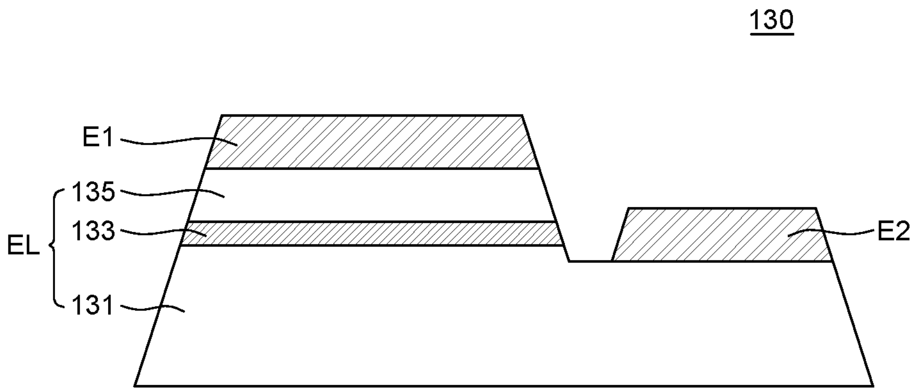
FIG. 2 is a view illustrating an embodiment of a light emitting diode included in each pixel of an electroluminescent display panel.

FIG. 1 is a block diagram of an electroluminescent display device according to an exemplary embodiment of the present disclosure. FIG. 2 is a view illustrating an embodiment of a light emitting diode included in each pixel of an electroluminescent display panel.

Referring to FIGS. 1 and 2, an electroluminescent display device according to the present disclosure includes a display panel 10 equipped with a plurality of pixels PXL, display panel driving circuits 12 and 13 which supply signals to signal lines connected to the pixels PXL, and a timing controller 11 which controls the display panel driving circuits 12 and 13.

The display panel driving circuits 12 and 13 provide input image data DATA to each pixel PXL of the plurality of pixels PXL of the display panel 10. The display panel driving circuits 12 and 13 include a source driver 12 which supplies a data signal to each of a respective data line of a plurality of data lines 14, one data line being connected to one of the plurality of pixels PXL and a gate driver 13 which supplies a gate signal to each of a respective gate line of a plurality of gate lines 15, one gate line being connected to one of the plurality of pixels PXL.

In the display panel 10, a plurality of data lines 14 and a plurality of gate lines 15 are provided. Each pixel PXL is supplied with signals supplied from the data lines 14 and the gate lines 15 to be driven so that areas of the pixels PXL may be divided by the data lines 14 and the gate lines 15. The pixels PXL include light emitting diodes 130 such as an LED illustrated in FIG. 2.

The light emitting diode 130 may include an emission layer EL, a first electrode E1 (anode electrode), and a second electrode E2 (cathode electrode). The emission layer EL emits light by recoupling of the electrons and the holes which move in the first electrode E1 and between the first electrode E1 and the second electrode E2. The emission layer EL may include a first semiconductor layer 131, an active layer 133, and a second semiconductor layer 135.

The first semiconductor layer 131 supplies electrons to the active layer 133. For example, the first semiconductor layer 131 may be formed of an n-GaN based semiconductor material and the n-GaN based semiconductor material may include GaN, AlGaN, InGaN, AlInGaN, or the like. Si, Ge, Se, Te, C, or the like may be used as an impurity used to dope the first semiconductor layer 131.

The active layer 133 is provided on one side of the first semiconductor layer 131. The active layer 133 has a multi quantum well (MQW) structure having a well layer and a barrier layer with a band gap higher than the well layer. The active layer 133 may have a multi quantum well structure such as InGaN/GaN.

The second semiconductor layer 135 is provided on the active layer 133 to supply holes to the active layer 133. The second semiconductor layer 135 may be formed of a p-GaN based semiconductor material, and the p-GaN based semiconductor material may include GaN, AlGaN, InGaN, AlInGaN, or the like. Mg, Zn, Be, or the like may be used as an impurity used to dope the second semiconductor layer 135.

The first semiconductor layer 131, the active layer 133, and the second semiconductor layer 135 are sequentially laminated on a semiconductor substrate. The semiconductor substrate includes a semiconductor material, such as a sapphire substrate or a silicon (Si) substrate. The semiconductor substrate is used as a growth substrate for growing the first semiconductor layer 131, the active layer 133, and the second semiconductor layer 135 and then is separated from the first semiconductor layer 131 by a substrate separating process. The substrate separating process may be a laser lift off process or a chemical lift off process. The light emitting diode 130 from which the semiconductor substrate is separated is moved to each of the pixels PXL to be connected to the pixel driving circuit.

The first electrode E1 is provided on the second semiconductor layer 135. The second electrode E2 may be provided on the other side of the first semiconductor layer 131 so as to be electrically isolated from the active layer 133 and the second semiconductor layer 135. For example, the first electrode E1 and the second electrode E2 may be transparent conductive materials, and the transparent conductive materials may be indium tin oxide (ITO), indium zinc oxide (IZO), or the like, but are not limited thereto. Alternatively, each of the first electrode E1 and the second electrode E2 may be a material including one or more of metal materials such as Au, W, Pt, Si, Ir, Ag, Cu, Ni, Ti, or Cr, and an alloy thereof.

Light generated from the light emitting diode 130 passes through the first electrode E1 and the second electrode E2 to be emitted to the outside to display images. The first electrode E1 of the light emitting diode 130 may be referred to as an anode electrode and the second electrode E2 may be referred to as a cathode electrode.

Figure 3:
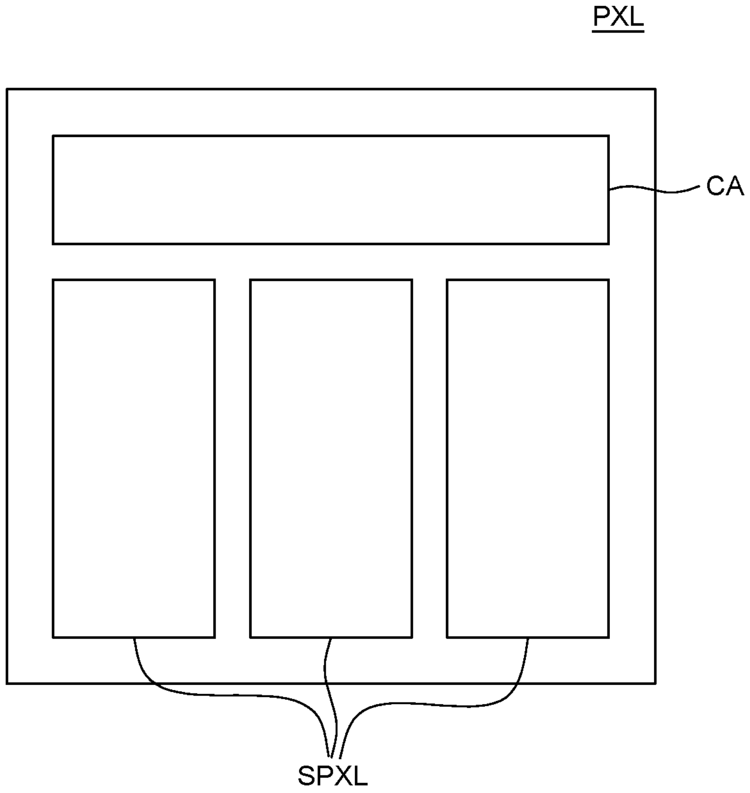
FIG. 3 is a view illustrating a configuration of a pixel included in the electroluminescent display panel.

FIG. 3 is a view illustrating a configuration of a pixel PXL of the plurality of pixels PXL included in the electroluminescent display panel 10 of FIG. 1.

Areas in which the pixels PXL are disposed may be referred to as pixel areas. One pixel PXL of the plurality of pixels PXL may be arranged in one pixel area. Each pixel PXL of the plurality of sub pixels SPXL may include a plurality of sub pixels SPXL. Areas in which the sub pixels SPXL of one or more pixels PXL are disposed may also be referred to as sub pixel areas. One sub pixels SPXL of the plurality of sub pixels SPXL of one pixel PXL may be arranged in one sub pixel area. Each sub pixels SPXL of the plurality of sub pixels SPXL of one pixel PXL may be arranged in one respective sub pixel area. More than one sub pixels SPXL of the plurality of sub pixels SPXL of one pixel PXL may be arranged in one pixel area. Preferably, all sub pixels SPXL of one pixel PXL are disposed in one pixel area. Each of the sub pixels SPXL may be any one of a red sub pixel, a green sub pixel, a blue sub pixel, and a white sub pixel to implement various colors. The color implemented in the pixel PXL may be determined by an emission ratio of the red sub pixel, the green sub pixel, the blue sub pixel, and the white sub pixel. Each sub pixel SPXL includes a light emitting diode 130 and a pixel driving circuit to emit color light of the sub pixels SPXL. Further, in order to minimize an area occupied by the pixel driving circuit, a part of the pixel driving circuit may be shared by the sub pixels SPXL. The pixel driving circuit shared by the sub pixels SPXL may be disposed in a common area CA of the pixel area. The pixel area of one pixel PXL includes a plurality of sub pixel areas, preferably the plurality of sub pixel areas, and a common area CA. The pixel driving circuit disposed in the common area CA will be described in detail below.

Referring to FIG. 1 again, power voltages are supplied to the sub pixels SPXL by means of power lines, as well as the data line 14 and the gate line 15. The power voltage is supplied from a power generating unit and includes a high potential voltage VDD (supplied via a first power lines), a low potential voltage VSS (supplied via a second power lines), an initialization voltage Vini (supplied via an initial voltage line), and a reference voltage Vref (supplied via a reference voltage line). The high potential voltage VDD is supplied to the sub pixels SPXL by means of the first power line and the low potential voltage VSS is supplied to the sub pixels SPXL by means of the second power line. The initialization voltage Vini is supplied to the sub pixels SPXL by means of the third power line (also referred to as initial voltage line) and the reference voltage Vref is supplied to the sub pixels SPXL by means of the fourth power line (also referred to as reference voltage line). For example, the high potential voltage VDD may be higher than the reference voltage Vref, the reference voltage Vref may be higher than the low potential voltage VSS, and the low potential voltage VSS may be higher than the initialization voltage Vini. A structural shape of the power lines connected to the sub pixels SPXL may include a linear shape and a planar shape formed over two or more sub pixels SPXL.

The source driver 12 converts input image data DATA received from the timing controller 11 into a data voltage Vdata at every frame, and then supplies the data voltage Vdata to the data lines 14. The source driver 12 outputs the data voltage Vdata using a digital to analog converter which converts input image data DATA into a gamma compensation voltage. For example, the data voltage Vdata may be a voltage between the low potential voltage VSS and the high potential voltage VDD.

The gate driver 13 may be formed directly on a substrate of the display panel 10 together with the pixels PXL by a gate drive-in-panel process, but the forming is not limited thereto. The gate driver 13 may be manufactured as an integrated circuit (IC) type and then bonded onto the display panel 10 by means of a conductive film.

The timing controller 11 generates a data timing control signal DDC for controlling an operation timing of the source driver 12 and a gate timing control signal GDC for controlling an operation timing of the gate driver 13, based on a timing control signal received from a host system which is not illustrated. For example, the timing control signal includes a vertical synchronization signal Vsync, a horizontal synchronization signal Hsync, a data enable signal DE, and the like.

Figure 4A:
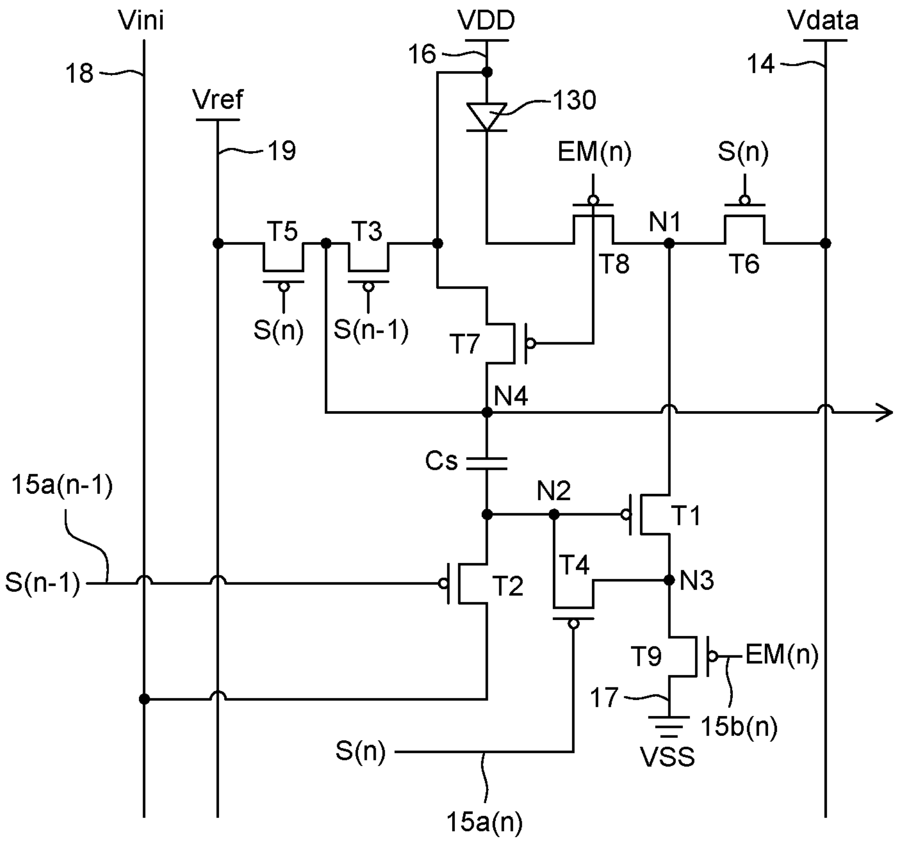
FIG. 4A is a diagram of a pixel driving circuit according to an exemplary embodiment of the present disclosure.
Figure 4B:
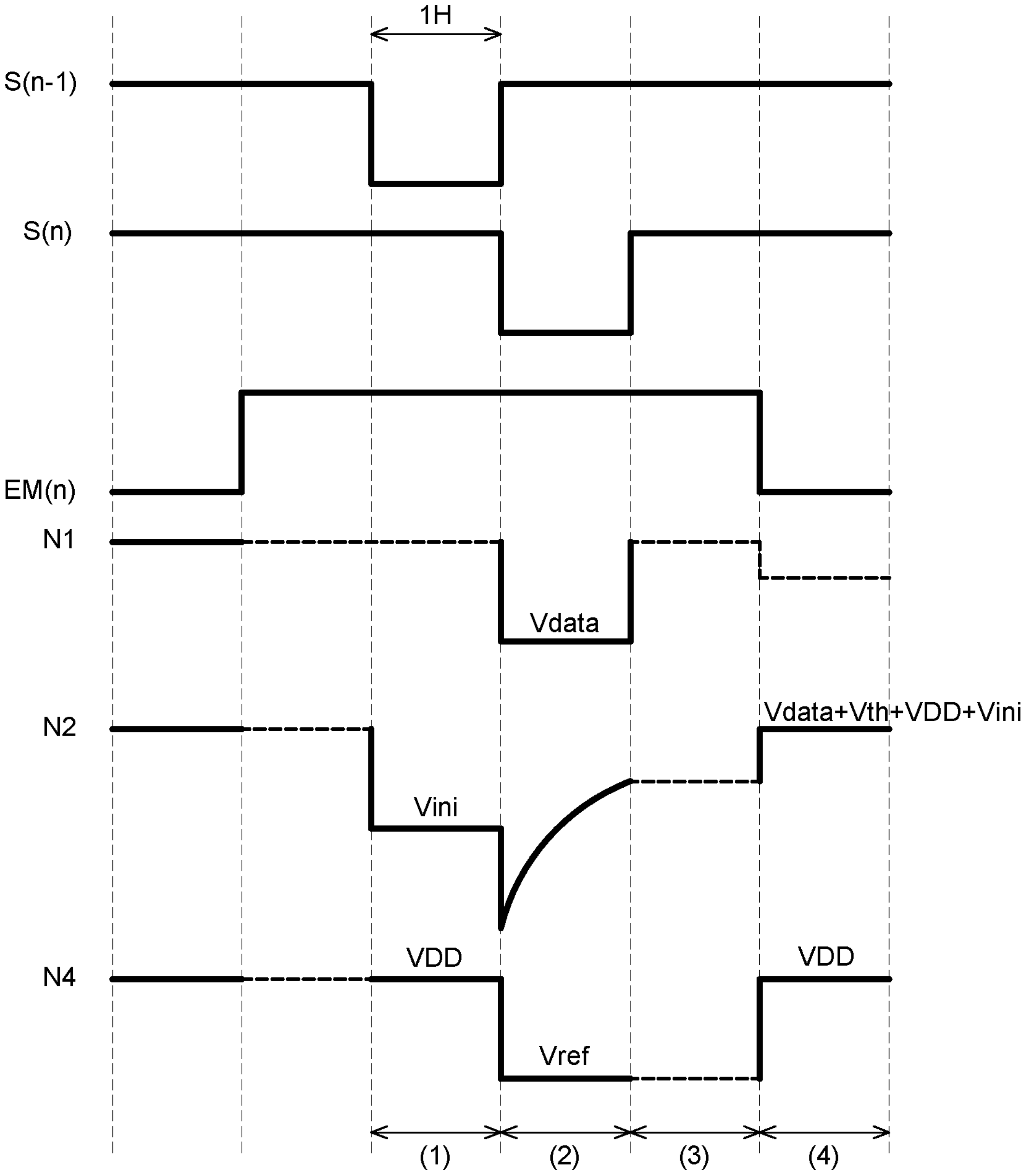
FIG. 4B illustrates signal waveforms input to the pixel driving circuit according to an exemplary embodiment of the present disclosure.

FIG. 4A is a diagram of a pixel driving circuit according to an exemplary embodiment of the present disclosure, and FIG. 4B illustrates signal waveforms input to the pixel driving circuit according to an exemplary embodiment of the present disclosure. The pixel driving circuit of FIG. 4A may operate a pixel PXL (or a sub pixel SPXL thereof) as shown in FIG. 1.

Referring to FIG. 4A, a pixel driving circuit according to an exemplary embodiment of the present disclosure includes a driving element, a N1 switching circuit, a N2 switching circuit, a N3 switching circuit, a N4 switching circuit, and a capacitor. In FIG. 4A, the pixel driving circuit included in pixels PXL located in an n-th row and/or included in sub pixels SPXL located an n-th row will be described as an example. An n-th scan signal S(n), an n−1-th scan signal S(n−1), and an n-th emission signal EM(n) are supplied to the pixel driving circuits located in the n-th row. The n-th scan signal S(n) is supplied through an n-th scan line 15*a*(*n*), the n−1-th scan signal S(n−1) is supplied through an n−1-th scan line 15*a*(*n*−1), and the n-th emission signal EM(n) is supplied through an n-th emission line 15*b*(*n*). The n-th scan line 15*a*(*n*), the n−1-th scan line 15*a*(*n*−1), and the n-th emission line 15*b*(*n*) are gate lines 15.

The driving element (e.g. transistor T1) generates a driving current in accordance with a data voltage provided via data line 14 and supplies the driving current to the cathode electrode of the light emitting diode 130. The anode electrode of the light emitting diode 130 is connected to a first power line 16 through which the high potential voltage VDD flows and the cathode electrode is electrically connected to the driving element. The anode electrodes of all the light emitting diodes 130 disposed on the display panel 10 are connected to the first power line 16 so that the first power line 16 through which the high potential voltage VDD flows may be shared by the light emitting diodes 130 included in all the pixels PXL on the display panel 10. In this case, the first power line 16 may be implemented by a planar shape with holes or a mesh type plate. Further, the cathode electrodes of the light emitting diodes 130 may be disposed to be spaced apart from each other for every sub pixel SPXL to supply different driving currents for every sub pixel SPXL of the pixel PXL.

When the light emitting diode 130 emits light, a voltage of the cathode electrode is relatively lower than a voltage of the anode electrode. In the pixel driving circuit, the driving element and the switching circuits other than the light emitting diode 130 generate a driving current such that a voltage of the cathode electrode of the light emitting diode 130 is relatively lower than the high potential voltage VDD to cause the light emitting diode 130 to emit light.

The pixel driving circuits according to all exemplary embodiments of the present disclosure are implemented by P-type transistors, specifically, PMOS TFTs (P-channel metal oxide semiconductor thin film transistors). When the P-type transistors are turned off, a voltage of the gate is a logic high voltage. For example, when the second power line

17 through which the low potential voltage VSS is supplied is connected to the cathode electrode of the light emitting diode 130 and the driving current generated from the driving element is applied to the anode electrode, any one or more transistors of the driving element and the switching circuits are affected by the static electricity. Therefore, when the defect is caused in any one or more transistors of the driving element and the switching circuits by the static electricity, the gate voltage of the turned-off transistor is a logic high voltage, which affects the anode electrode of the light emitting diode 130 so that a bright spot may be easily generated. To be more specific, the above-mentioned defect may mean that the gate insulating layer of the transistor is broken down due to the static electricity to cause short-circuit between the gate and the active layer. The logic high voltage transmitted through the shorted gate and active layer is transmitted to the anode electrode of the light emitting diode 130 and causes the light emitting diode 130 to emit light. Accordingly, in order to suppress the light emitting diode 130 from unnecessarily emitting light to be recognized as a bright spot, the first power line 16 is connected to the anode electrode of the light emitting diode 130 to be applied with the high potential voltage VDD. Further, the pixel driving circuit is electrically connected to the cathode electrode. As a result, it is possible to suppress the bright spots generated in the display panel.

The driving element is implemented by a T1 transistor and a gate electrode, a source electrode, and a drain electrode of the T1 transistor are connected to a N2 node, a N1 node, and a N3 node, respectively. The driving element is turned on by the gate voltage to provide a constant driving current to the N1 node.

The N1 switching circuit includes a T6 transistor and a T8 transistor. The T6 transistor is controlled by the n-th scan signal S(n) to supply the data voltage Vdata flowing through the data line 14 to the N1 node. The data voltage Vdata is supplied to the N1 node so that the driving element generates a driving current in accordance with the data voltage Vdata. The T8 transistor is controlled by the n-th emission signal EM(n) to conduct the N1 node and the cathode electrode of the light emitting diode 130. The T8 transistor may control the emission timing of the light emitting diode 130.

The N2 switching circuit includes a T2 transistor and a T4 transistor. The T2 transistor is controlled by the n−1-th scan signal S(n−1) to supply the initialization voltage Vini flowing through the third power line 18 to the N2 node. The initialization voltage Vini supplied to the N2 node discharges the gate of the T1 transistor to the initialization voltage Vini to compensate for a threshold voltage of the driving element and apply an exact voltage to the gate of the driving element when the driving current is generated. The T4 transistor is controlled by the n-th scan signal S(n) to conduct the N2 node and the N3 node. The T4 transistor extracts the threshold voltage of the driving element by conducting the gate and the drain of the driving element. The extracted threshold voltage is reflected to the gate voltage of the driving element and is finally cancelled with the driving current generated by the driving element so that the threshold voltage of the driving element is compensated.

The N3 switching circuit includes a T9 transistor. The T9 transistor is controlled by the n-th emission signal EM(n) to supply the low potential voltage VSS to the N3 node. The T9 transistor supplies the low potential voltage VSS to the drain of the driving element to generate a driving current.

The N4 switching circuit includes a T3 transistor, a T5 transistor, and a T7 transistor. The T3 transistor is controlled by the n−1-th scan signal S(n−1) to supply the high potential voltage VDD to the N4 node. The T3 transistor supplies a constant voltage to the N4 node floated after the light emitting diode 130 emits light, and couples an exact voltage to be applied to the gate of the driving element during the compensation period. The T5 transistor is controlled by the n-th scan signal S(n) to supply the reference voltage Vref to the N4 node. The T5 transistor supplies the reference voltage Vref to the N4 node next to the high potential voltage VDD, to adjust the voltage of the N2 node by means of the capacitor Cs. The T7 transistor is controlled by the n-th emission signal EM(n) to supply the high potential voltage VDD to the N4 node. The T7 transistor maintains the N4 node at a constant voltage while the light emitting diode 130 emits light to make the driving current constant. The N4 switching circuit is not directly connected to the driving element and supplies a constant voltage of the high potential voltage VDD or the reference voltage Vref to the N4 node so that the N4 switching circuit may be shared by the plurality of sub pixels SPXL included in one pixel PXL. The N4 switching circuit may be shared by a plurality of pixels PXL depending on the size of the transistors which configure the N4 switching circuit. The size of the transistors may be determined by a time of charging the capacitor Cs.

Also referring to FIG. 3, the N4 switching circuit of FIG. 4A is disposed in a common area CA of the pixel PXL to be shared by the sub pixels SPXL. In this case, the N4 node may be shared by the sub pixels SPXL. Accordingly, an area occupied by the sub pixels SPXL may be reduced and as a result, the area of the pixel PXL is reduced so that a display panel with a high resolution may be implemented.

The capacitor Cs is implemented by two electrodes which are connected to the N4 node and the N2 node, respectively. The capacitor Cs adjusts a voltage of the N2 node using a coupling characteristic of the capacitor Cs element and fixes a voltage applied to the gate of the driving element during the emission to make the driving current and the emission luminance constant.

Referring to FIGS. 4A and 4B, the driving of the pixel driving circuit may be divided into an initialization period (1), a sampling period (2), a holding period (3), and an emission period (4). In the waveform of FIG. 4B, a portion denoted with dotted lines is a portion in which the node is floated and is fluctuated with a voltage other than the voltage illustrated with the dotted lines.

The n−1-th scan signal S(n−1) and the n-th scan signal S(n) include a pulse which is a logic low voltage during one horizontal period 1H and the n-th emission signal EM(n) includes a pulse of a logic high voltage during at least two horizontal periods 2H. One horizontal period 1H in which the n−1-th scan signal S(n−1) is a logic low voltage is referred to as an initialization period (1) of the pixel driving circuit. One horizontal period 1H in which the n-th scan signal S(n) is a logic low voltage is referred to as a sampling period (2) of the pixel driving circuit. Even though in FIG. 4B it is illustrated that the n-th emission signal EM(n) has a logic high voltage during four horizontal periods 4H, it is not limited thereto. The n-th emission signal EM(n) has a logic high voltage during at least the initialization period (1) and the sampling period (2) of the pixel driving circuit to suppress the light emitting diode 130 from emitting light. The n-th emission signal EM(n) may be a logic low voltage during a period other than the initialization period (1) and the sampling period (2) or a period other than the four horizontal periods 4H. A period in which the n-th emission signal EM(n) is a logic low voltage is referred to as an emission period (4) of the pixel driving circuit.

During the initialization period (1), the pixel driving circuit turns on the T3 transistor to apply the high potential voltage VDD to the N4 node and turns on the T2 transistor to apply the initialization voltage Vini to the N2 node. Accordingly, a capacitance corresponding to a difference between the high potential voltage VDD and the initialization voltage Vini is stored in the capacitor Cs.

During the sampling period (2), the pixel driving circuit turns on the T5 transistor to apply the reference voltage Vref to the N4 node. A voltage of the N4 node is changed from the high potential voltage VDD to the reference voltage Vref so that the N2 node drops to a voltage of (Vini+Vref−VDD) at a starting timing of the sampling period (2), due to the coupling of the capacitor Cs.

During the sampling period (2), the pixel driving circuit turns on the T6 transistor to apply the data voltage Vdata to the N1 node and turns on the T4 transistor to conduct the N2 node and the N3 node. Accordingly, the gate and the drain of the driving element are shorted so that the voltage of the N2 node rises until the difference between the voltage of the N2 node and the voltage of the N1 node corresponds to the threshold voltage Vth of the driving element. Accordingly, the voltage of the N2 node is (Vdata+Vth) at an ending timing of the sampling period (2). It takes time to raise the voltage of the N2 node. In order to exactly sample the threshold voltage of the driving element, a sufficient sampling time needs to be given. Further, it also takes time to completely switch the n-th scan signal S(n) to the logic high voltage so that a holding period (3) may be provided after the sampling period (2). The holding period (3) is illustrated as one horizontal period (1H), but is not limited thereto. Also, during the holding period (3), in order to suppress the light emitting diode 130 from emitting light, the n-th emission signal EM(n) maintains a logic high voltage. Further, as the n-th emission signal EM(n) is switched to a logic low voltage, the emission of the light emitting diode 130 starts.

During the emission period (4), the pixel driving circuit turns on the T7 transistor to apply the high potential voltage VDD to the N4 node. As the voltage of the N4 node is changed from the reference voltage Vref to the high potential voltage VDD, the voltage of the N2 node is Vdata+Vth+VDD−Vref due to the coupling of the capacitor Cs.

During the emission period (4), the pixel driving circuit turns on the T9 transistor to apply the low potential voltage VSS to the N3 node to turn on the driving element and turns on the T8 transistor to conduct the cathode electrode of the light emitting diode 130 and the N1 node. Accordingly, a driving current is supplied to the light emitting diode 130 to emit light. In this case, the voltage of the N1 node has a difference between the high potential voltage VDD and the threshold voltage of the light emitting diode 130. A driving current $I_D$ of the driving element is expressed by Equation 1.

$$I_D=k(V\text{data}-V\text{ref})^2/2 \quad \text{[Equation 1]}$$

In Equation 1, k is a constant value for a characteristic of the driving element. Referring to Equation 1, in the driving current $I_D$, the threshold voltage Vth of the driving element is eliminated so that the driving current $I_D$ does not depend on the threshold voltage Vth of the driving element and is not affected by the variation of the threshold voltage Vth.

Further, the driving current $I_D$ is affected not by the high potential voltage VDD which drops the voltage due to the influence of the current, but by the reference voltage Vref which is hardly affected by the voltage drop by applying a constant voltage. Therefore, the luminance variation depending on the position of the pixel PXL on the display panel may be suppressed.

Figure 5A:
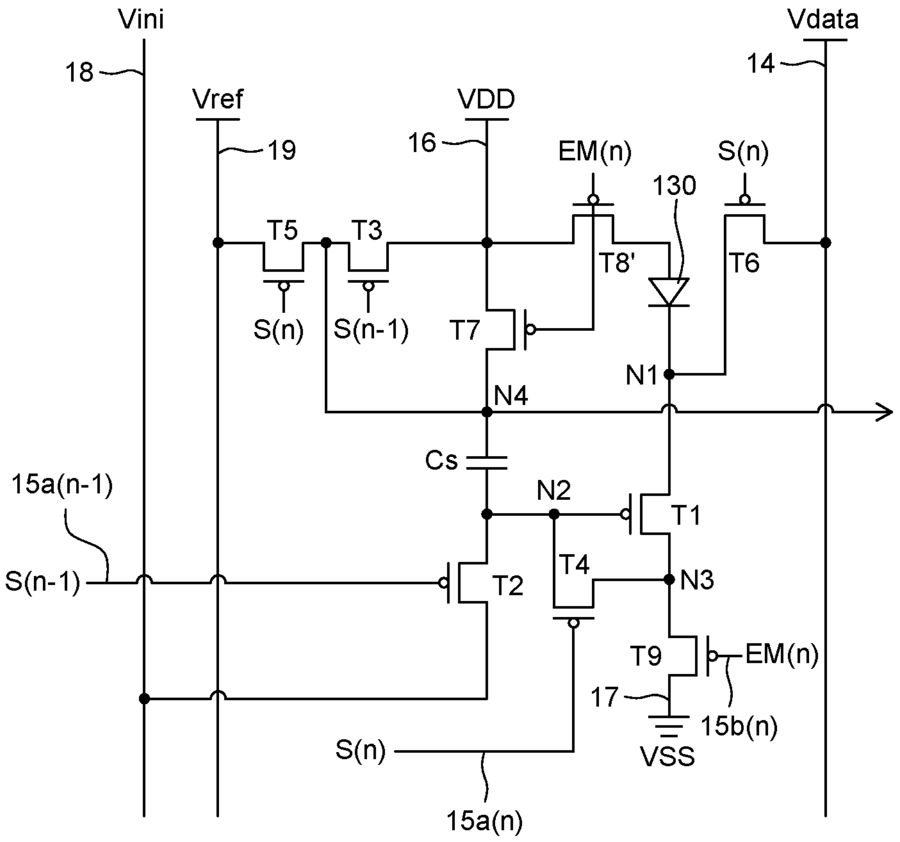
FIG. 5A is a diagram of a pixel driving circuit according to another exemplary embodiment of the present disclosure.
Figure 5B:
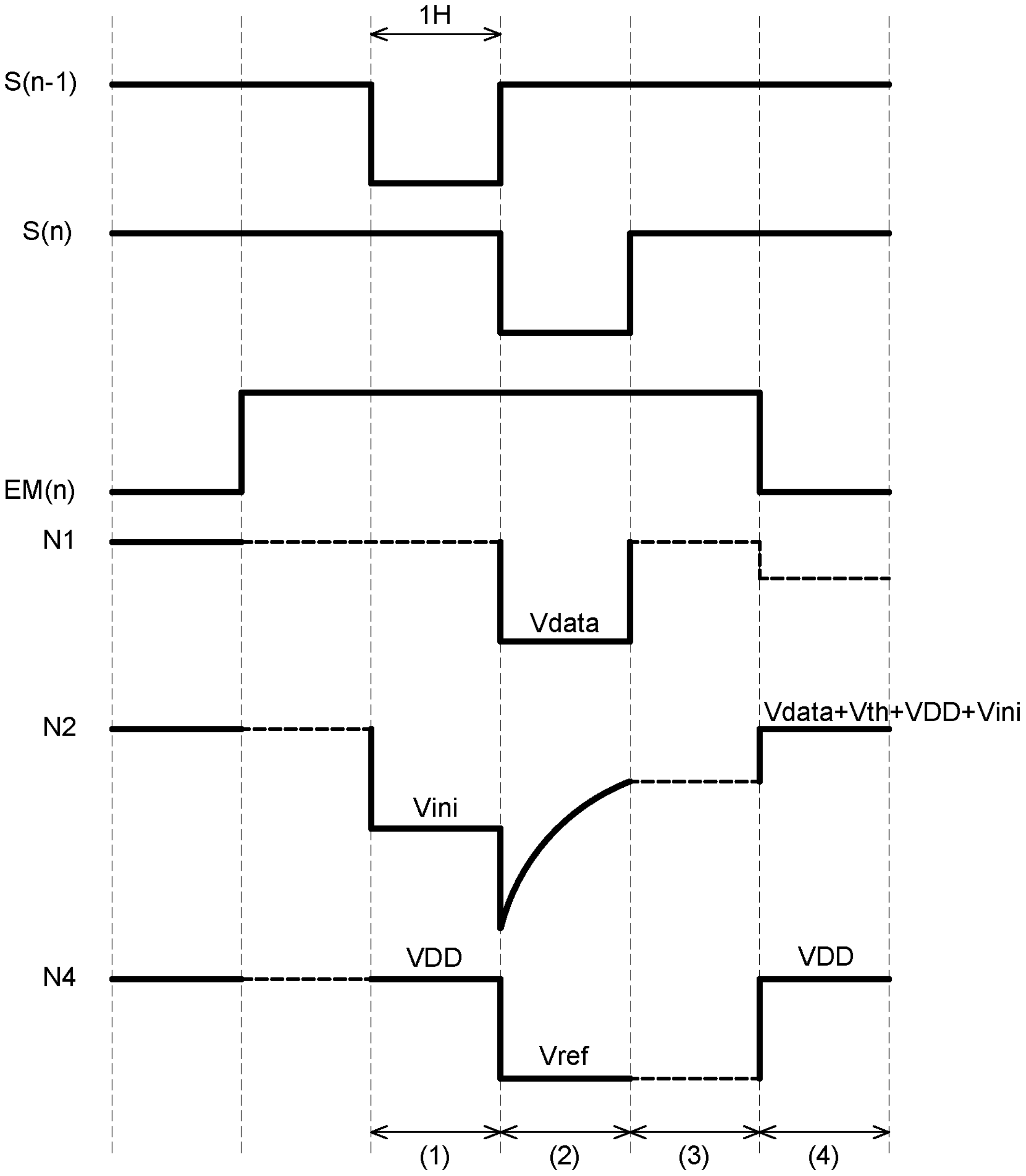
FIG. 5B illustrates signal waveforms input to the pixel driving circuit according to another exemplary embodiment of the present disclosure.

FIG. 5A is a diagram of a pixel driving circuit according to another exemplary embodiment of the present disclosure, and FIG. 5B illustrates signal waveforms input to the pixel driving circuit according to another exemplary embodiment of the present disclosure. The pixel driving circuit of FIG. 5A may operate a pixel (or a sub pixel SPXL thereof) as shown in FIG. 1.

Referring to FIG. 5A, a pixel driving circuit according to another exemplary embodiment of the present disclosure includes a driving element, a N1 switching circuit, a N2 switching circuit, a N3 switching circuit, a N4 switching circuit, and a capacitor. In the pixel driving circuit of FIG. 5A, only the connection relationship between the N1 switching circuit and the light emitting diode 130 is different from the pixel driving circuit of FIG. 4A and the other components are applied in the same way so that description of the repeated components will be omitted. Further, a signal waveform diagram of FIG. 5B is the same as the signal waveform diagram of FIG. 4B, so that the description will be performed in brief or omitted.

According to the connection relationship between the pixel driving circuit according to the exemplary embodiment of the present disclosure and the light emitting diode 130, the anode electrode of the light emitting diode 130 is electrically connected to a first power line 16 through which the high potential voltage VDD flows. Further, the cathode electrode is connected to the driving element. The anode electrodes of all the light emitting diodes 130 disposed on the display panel are supplied with the high potential voltage VDD so that the first power line 16 through which the high potential voltage VDD flows may be shared by the light emitting diodes 130 in all the pixels. In this case, the first power line 16 may be implemented by a planar shape with holes or a mesh type plate. Further, the cathode electrodes of the light emitting diodes 130 may be disposed to be spaced apart from each other for every sub pixel SPXL to supply different driving currents for every sub pixel SPXL. The cathode electrode of the light emitting diode 130 is connected to the N1 node of the pixel driving circuit disposed in each sub pixel SPXL.

When the light emitting diode 130 emits light, a potential of the cathode electrode is relatively lower than a potential of the anode electrode. In the pixel driving circuit, the driving element and the switching circuits other than the light emitting diode 130 are driven such that a voltage of the cathode electrode of the light emitting diode 130 is relatively lower than the high potential voltage VDD to cause the light emitting diode 130 to emit light.

The pixel driving circuit according to the exemplary embodiment of the present disclosure is implemented by p-type transistors, specifically, PMOS TFTs (P-channel metal oxide semiconductor thin film transistors). When the P-type transistors are turned off, a voltage of the gate is a logic high voltage. The pixel driving circuit is implemented with a structure in which the first power line 16 is connected to the anode electrode of the light emitting diode 130 to supply the high potential voltage VDD and the source of the driving element is connected to the cathode electrode. Therefore, even though the gate insulating layer of the transistor is broken down due to the static electricity so that short is caused between the gate and the active layer, the bright dot may be suppressed from being generated in the display panel.

The connection relationship of the driving element, the N2 switching circuit, the N3 switching circuit, the N4 switching circuit, and the capacitor of the pixel driving circuit is the same as that of the components of the pixel driving circuit illustrated in FIG. 4A. Therefore, a description thereof is omitted and hereinafter, the N1 switching circuit will be described.

The N1 switching circuit includes a T6 transistor and a T8' transistor. The T6 transistor is controlled by the n-th scan signal S(n) to supply the data voltage Vdata flowing through the data line 14 to the N1 node. The T8' transistor is controlled by the n-th emission signal EM(n) to conduct the first power line 16 and the cathode electrode of the light emitting diode 130. The T8' transistor may control the emission timing of the light emitting diode 130.

Referring to FIGS. 5A and 5B, the driving of the pixel driving circuit may be divided into an initialization period (1), a sampling period (2), a holding period (3), and an emission period (4).

During the initialization period (1), the pixel driving circuit turns on the T3 transistor to apply the high potential voltage VDD to the N4 node and turns on the T2 transistor to apply the initialization voltage Vini to the N2 node to discharge the gate of the T1 transistor.

During the sampling period (2), the pixel driving circuit turns on the T5 transistor to apply the reference voltage Vref to the N4 node. A voltage of the N4 node is changed from the high potential voltage VDD to the reference voltage Vref so that the N2 node drops to a voltage of Vini+Vref−VDD at a starting timing of the sampling period (2), due to the coupling of the capacitor Cs.

During the sampling period (2), the pixel driving circuit turns on the T6 transistor to apply the data voltage Vdata to the N1 node and turns on the T4 transistor to conduct the N2 node and the N3 node. Accordingly, the voltage of the N2 node rises. Accordingly, the voltage of the N2 node is Vdata+Vth at an ending timing of the sampling period (2). Next to the sampling period (2), the holding period (3) is illustrated as one horizontal period (1H), but is not limited thereto. The holding period (3) may be omitted.

During the emission period (4), the pixel driving circuit turns on the T7 transistor to apply the high potential voltage VDD to the N4 node. As the voltage of the N4 node is changed from the reference voltage Vref to the high potential voltage VDD, the voltage of the N2 node is Vdata+Vth+VDD−Vref due to the coupling of the capacitor Cs.

During the emission period (4), the pixel driving circuit turns on the T9 transistor to apply the low potential voltage VSS to the N3 node to turn on the driving element and turns on the T8' transistor to conduct the anode electrode of the light emitting diode 130 and the first power line 16. Accordingly, the light emitting diode 130 emits light. In this case, a driving current $I_D$ of the driving element is expressed by Equation 1 above.

As described above, the driving current $I_D$ is affected not by the high potential voltage VDD which drops due to the influence of the current, but by the reference voltage Vref which is hardly affected by the voltage drop by applying a constant voltage. Therefore, the luminance variation depending on the position of the pixel PXL on the display panel may be suppressed.

Figure 6A:
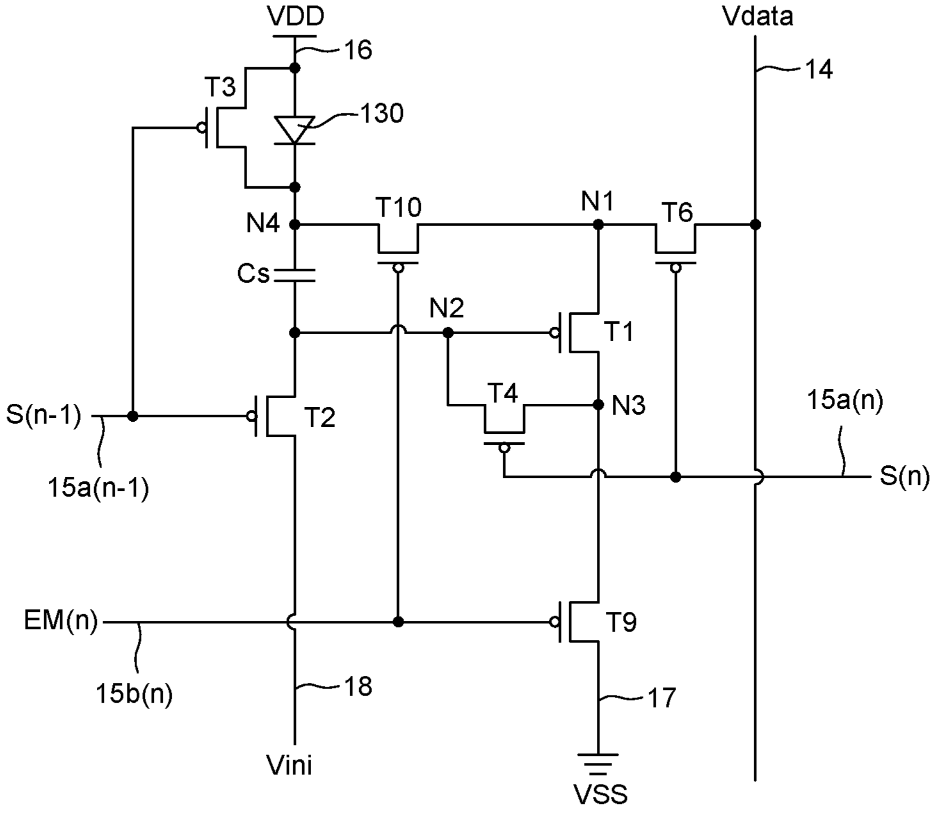
FIG. 6A is a diagram of a pixel driving circuit according to still another exemplary embodiment of the present disclosure.
Figure 6B:
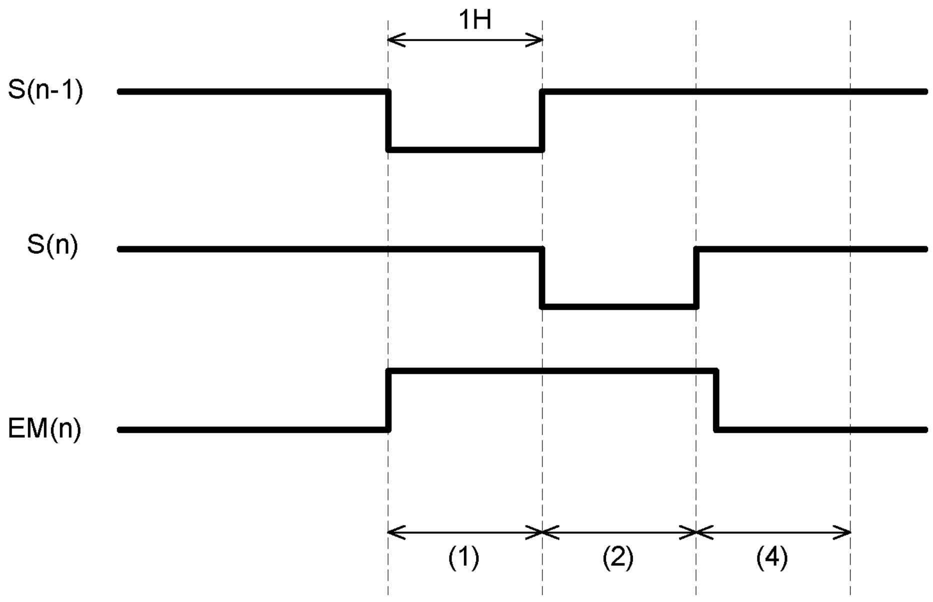
FIG. 6B illustrates signal waveforms input to the pixel driving circuit according to another exemplary embodiment of the present disclosure.

FIG. 6A is a diagram of a pixel driving circuit according to still another exemplary embodiment of the present disclosure, and FIG. 6B illustrates signal waveforms input to a pixel driving circuit according to still another exemplary embodiment of the present disclosure. The pixel driving circuit of FIG. 6A may operate a pixel PXL (or a sub pixel SPXL thereof) as shown in FIG. 1.

Referring to FIG. 6A, a pixel driving circuit according to an exemplary embodiment of the present disclosure includes a driving element, a N1 switching circuit, a N2 switching circuit, a N3 switching circuit, an emission control circuit, and a capacitor. In FIG. 6A, a description of the repeated components among the components included in the pixel driving circuit of FIG. 4A or FIG. 5A will be omitted.

The anode electrode of the light emitting diode 130 is connected to a first power line 16 through which the high potential voltage VDD flows and the cathode electrode is electrically connected to the driving element. The anode electrodes of all the light emitting diodes 130 disposed on the display panel are connected to the high potential voltage VDD so that the first power line 16 through which the high potential voltage VDD flows may be shared by the light emitting diodes 130 in all the pixels. In this case, the first power line 16 may be implemented by a planar shape with holes or a mesh type plate. Further, the cathode electrodes of the light emitting diodes 130 may be disposed to be spaced apart from each other for every sub pixel SPXL to supply different driving current for every sub pixel SPXL.

The pixel driving circuit is implemented with a structure in which the first power line 16 is connected to the anode electrode of the light emitting diode 130 to supply the high potential voltage VDD and the source of the driving element is electrically connected to the cathode electrode. Therefore, the bright dot may be suppressed from being generated in the display panel, even though the gate insulating layer of the transistor is broken down due to the static electricity so that short is caused between the gate and the active.

The driving element is implemented by the T1 transistor and a gate, a source, and a drain of the T1 transistor are connected to a N2 node, a N1 node, and a N3 node, respectively. The driving element is turned on by the gate voltage to provide a constant driving current to the N1 node.

The N1 switching circuit includes a T6 transistor and a T10 transistor. The T6 transistor is controlled by the n-th scan signal S(n) to supply the data voltage Vdata flowing through the data line 14 to the N1 node. The data voltage Vdata is supplied to the N1 node so that the driving element reflects a data voltage Vdata to a driving current. The T10 transistor is controlled by the n-th emission signal EM(n) to conduct the N1 node and the N4 node. The T10 transistor separates the cathode electrode of the light emitting diode 130 from the N1 node so that the light emitting diode 130 does not emit light during a period other than the emission period.

The N2 switching circuit includes a T2 transistor and a T4 transistor. The T2 transistor is controlled by the n−1-th scan signal S(n−1) to supply the initialization voltage Vini flowing through the third power line 18 to the N2 node. The initialization voltage Vini supplied to the N2 node discharges the gate of the T1 transistor to the initialization voltage Vini to compensate for a threshold voltage of the driving element and apply an exact voltage to the gate of the driving element when the driving current is generated. The T4 transistor is controlled by the n-th scan signal S(n) to conduct the N2 node and the N3 node. The T4 transistor extracts the threshold voltage of the driving element by conducting the gate and the drain of the driving element. The extracted threshold voltage is reflected to the gate voltage of the driving element and is finally cancelled with the driving current generated by the driving element so that the threshold voltage of the driving element is compensated.

The N3 switching circuit includes a T9 transistor. The T9 transistor is controlled by the n-th emission signal EM(n) to supply the low potential voltage VSS to the N3 node. The T9 transistor supplies the low potential voltage VSS to the drain of the driving element to generate a driving current.

The emission control circuit includes a T3 transistor. The T3 transistor is controlled by the n−1-th scan signal S(n−1) to supply the high potential voltage VDD to the N4 node and suppresses the light emitting diode 130 from emitting light due to the change of the N4 node voltage by the coupling effect of the capacitor Cs during the initialization period. Further, the T3 transistor suppresses the contrast ratio of the display panel from being reduced.

The capacitor Cs is implemented by two electrodes which are connected to the N4 node and the N2 node, respectively. The capacitor Cs adjusts a voltage of the N2 node using a coupling characteristic of the capacitor Cs element and fixes a voltage applied to the gate of the driving element during the emission to make the driving current and the emission luminance constant.

Referring to FIGS. 6A and 6B, the driving of the pixel driving circuit may be divided into an initialization period (1), a sampling period (2), and an emission period (4).

The n−1-th scan signal S(n−1) and the n-th scan signal S(n) include a pulse which is a logic low voltage during one horizontal period 1H and the n-th emission signal EM(n) includes a pulse of a logic high voltage during at least two horizontal periods 2H. One horizontal period 1H in which the n−1-th scan signal S(n−1) is a logic low voltage is referred to as an initialization period (1) of the pixel driving circuit. One horizontal period 1H in which the n-th scan signal S(n) is a logic low voltage is referred to as a sampling period (2) of the pixel driving circuit. Further, even though it is illustrated that the n-th emission signal EM(n) has a logic high voltage during approximately two horizontal periods 2H, it is not limited thereto. The n-th emission signal EM(n) has a logic high voltage during at least the initialization period (1) and the sampling period (2) of the pixel driving circuit to suppress the light emitting diode 130 from emitting light. The n-th emission signal EM(n) may be a logic low voltage during a period other than the initialization period (1) and the sampling period (2).

During the initialization period (1), the pixel driving circuit turns on the T3 transistor to apply the high potential voltage VDD to the N4 node and turns on the T2 transistor to apply the initialization voltage Vini to the N2 node. Accordingly, a capacitance corresponding to the difference between the high potential voltage VDD and the initialization voltage Vini is stored in the capacitor Cs. Further, the T3 transistor makes the anode and the cathode of the light emitting diode 130 equipotential, so that the emission of the light emitting diode 130 may be suppressed during the initialization period (1).

During the sampling period (2), the pixel driving circuit turns on the T6 transistor to apply the data voltage Vdata to the N1 node and turns on the T4 transistor to conduct the N2 node and the N3 node. Accordingly, the gate and the drain of the driving element are shorted so that the voltage of the N2 node rises until the difference between the voltage of the N2 node and the voltage of the N1 node corresponds to the threshold voltage Vth of the driving element. Accordingly, at the ending timing of the sampling period (2), the voltage of the N2 node is Vdata+Vth and the voltage of the N4 node is VDD+Vdata+Vth−Vini by the coupling of the capacitor Cs.

During the emission period (4), the pixel driving circuit turns on the T9 transistor to apply the low potential voltage VSS to the N3 node to turn on the driving element and turns on the T10 transistor to conduct the cathode electrode of the light emitting diode 130 and the N1 node. Accordingly, a driving current is supplied to the light emitting diode 130 to emit light. In this case, a driving current $I_D$ of the driving element is expressed by Equation 2.

$$I_D = k(V\text{data} - V\text{ini})^2/2 \quad \text{[Equation 2]}$$

In Equation 2, k is a constant value for a characteristic of the driving element. Referring to Equation 2, in the driving current $I_D$, the threshold voltage Vth of the driving element is eliminated so that the driving current $I_D$ does not depend on the threshold voltage Vth of the driving element and is not affected by the variation of the threshold voltage Vth.

Further, the driving current $I_D$ is affected not by the high potential voltage VDD which drops due to the influence of the current, but by the initialization voltage Vini which is hardly affected by any voltage drop by applying a constant voltage. Therefore, the luminance variation depending on the position of the pixel PXL on the display panel may be suppressed.

Figure 7A:
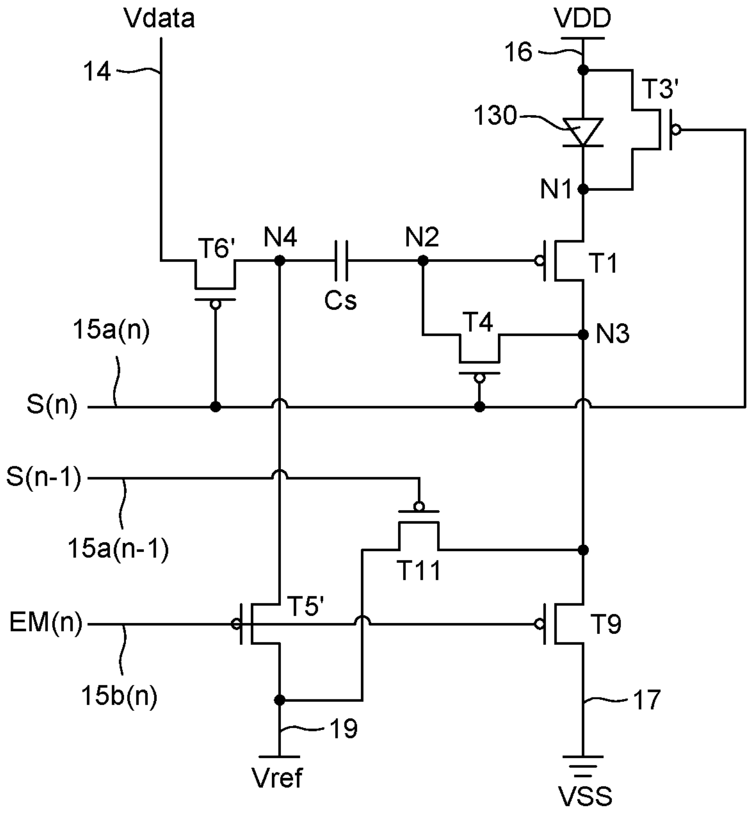
FIG. 7A is a diagram of a pixel driving circuit according to still another exemplary embodiment of the present disclosure.
Figure 7B:
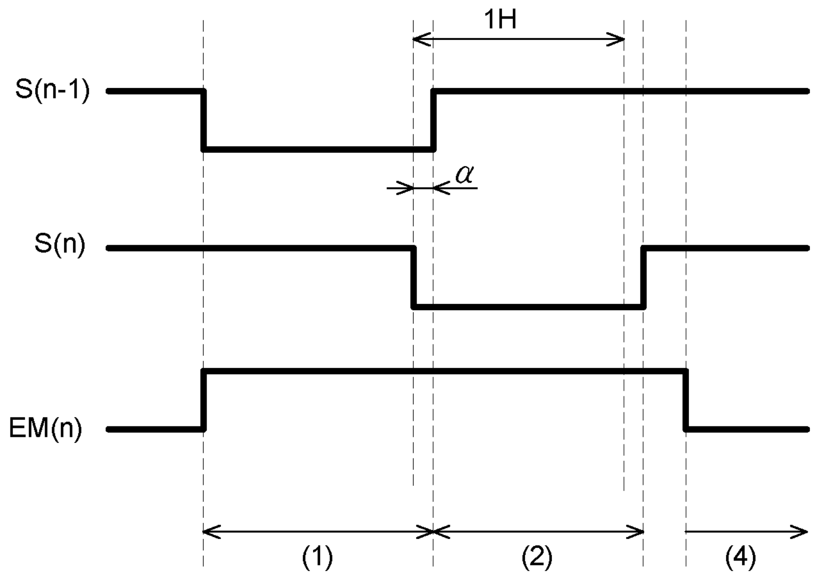
FIG. 7B illustrates signal waveforms input to the pixel driving circuit according to still another exemplary embodiment of the present disclosure.

FIG. 7A is a diagram of a pixel driving circuit according to still another exemplary embodiment of the present disclosure, and FIG. 7B illustrates signal waveforms input to the pixel driving circuit according to still another exemplary embodiment of the present disclosure. The pixel driving circuit of FIG. 7A may operate a pixel PXL (or a sub pixel SPXL thereof) as shown in FIG. 1.

Referring to FIG. 7A, a pixel driving circuit according to an exemplary embodiment of the present disclosure includes a driving element, a N2 switching circuit, a N3 switching circuit, a N4 switching circuit, an emission control circuit, and a capacitor. In FIG. 7A, a description of the repeated components among the components included in the pixel driving circuits of FIG. 4A, FIG. 5A, or FIG. 6A will be omitted.

The anode electrode of the light emitting diode 130 is connected to a first power line 16 through which the high potential voltage VDD flows and the cathode electrode is electrically connected to the driving element. The anode electrodes of all the light emitting diodes 130 disposed on the display panel are connected to the high potential voltage VDD so that the first power line 16 through which the high potential voltage VDD flows may be shared by the light emitting diodes 130 in all the pixels. In this case, the first power line 16 may be implemented by a planar shape with holes or a mesh type. Further, the cathode electrodes of the light emitting diodes 130 may be disposed to be spaced apart from each other for every sub pixel SPXL to supply different driving currents for every sub pixel SPXL.

The pixel driving circuit is implemented with a structure in which the first power line 16 is connected to the anode electrode of the light emitting diode 130 to supply the high potential voltage VDD and the source of the driving element is electrically connected to the cathode electrode. Therefore, the bright dot may be suppressed from being generated in the display panel, even though the gate insulating layer of the transistor is broken down due to the static electricity so that short is caused between the gate and the active layer.

The driving element is implemented by the T1 transistor and a gate, a source, and a drain of the T1 transistor are connected to a N2 node, a N1 node, and a N3 node, respectively. The driving element is turned on by the gate voltage to supply a constant driving current to the N1 node.

The N2 switching circuit includes a T4 transistor. The T4 transistor is controlled by the n-th scan signal S(n) to conduct the N2 node and the N3 node. The T4 transistor extracts the threshold voltage of the driving element by conducting the gate and the drain of the driving element. The extracted threshold voltage is reflected to the gate voltage of the driving element and is finally cancelled with the driving current generated by the driving element so that the threshold voltage of the driving element is compensated.

The N3 switching circuit includes a T9 transistor and a T11 transistor. The T9 transistor is controlled by the n-th emission signal EM(n) to supply the low potential voltage VSS to the N3 node. The T9 transistor supplies the low potential voltage VSS to the drain of the driving element to generate a driving current. The T11 transistor is controlled by the n−1-th scan signal S(n−1) to supply the reference voltage Vref to the N3 node. Accordingly, the drain of the driving element is reset to be the reference voltage Vref.

The N4 switching circuit includes a T6' transistor and a T5' transistor. The T6' transistor is controlled by the n-th scan signal S(n) to supply the data voltage Vdata to the N4 node. Accordingly, the data voltage Vdata is applied to the gate of the driving element. The T5' transistor is controlled by the n-th emission signal EM(n) to supply the reference voltage Vref to the N4 node. The T5' transistor supplies the constant voltage to the N4 node so that during the emission period, the N2 node may maintain a constant voltage without being fluctuated.

The emission control circuit includes a T3' transistor. The T3' transistor is controlled by the n-th scan signal S(n) to supply the high potential voltage VDD to the N1 node and suppresses the light emitting diode 130 from emitting light during a period in which the data voltage Vdata is supplied to the N1 node.

The capacitor Cs is implemented by two electrodes which are connected to the N4 node and the N2 node. The capacitor Cs adjusts a voltage of the N2 node using a coupling characteristic of the capacitor Cs element and fixes a voltage applied to the gate of the driving element during the emission to make the driving current and the emission luminance constant.

Referring to FIGS. 7A and 7B, the driving of the pixel driving circuit may be divided into an initialization period (1), a sampling period (2), and an emission period (4).

The n−1-th scan signal S(n−1) and the n-th scan signal S(n) include a pulse which is a logic low voltage during at least one horizontal period 1H, and the n-th emission signal EM(n) includes a pulse of a logic high voltage during at least two horizontal periods 2H. A period in which the n−1-th scan signal S(n−1) is a logic low voltage is referred to as an initialization period (1) of the pixel driving circuit. A period in which the n-th scan signal S(n) is a logic low voltage is referred to as a sampling period (2) of the pixel driving circuit. The initialization period (1) and the sampling period (2) overlap by a period of α. Specifically, the n−1-th scan signal S(n−1) and the n-th scan signal S(n) have a pulse of a logic low voltage during a period obtained by adding one horizontal period 1H and α. In that case, α is a shorter period than one horizontal period 1H. Further, even though it is illustrated that the n-th emission signal EM(n) has a logic high voltage during approximately two horizontal periods 2H, it is not limited thereto. The n-th emission signal EM(n) has a logic high voltage during at least the initialization period (1) and the sampling period (2) of the pixel driving circuit to suppress the light emitting diode 130 from emitting light. The n-th emission signal EM(n) may be a logic low voltage during a period other than the initialization period (1) and the sampling period (2).

The pixel driving circuit turns on the T11 transistor during the initialization period (1) to apply the reference voltage Vref to the N3 node to reset the drain of the driving element to the reference voltage Vref. Further, when the initialization period (1) substantially ends, the pixel driving circuit turns on the T4 transistor to also apply the reference voltage Vref to the N2 node to reset the gate of the driving element to the reference voltage Vref.

During the sampling period (2), the pixel driving circuit turns on the T6' transistor to apply the data voltage Vdata to the N4 node, turns on the T3' transistor to apply the high potential voltage VDD to the N1 node, and turns on the T4 transistor to conduct the N2 node and the N3 node. Accordingly, the gate and the drain of the driving element are shorted so that the voltage of the N2 node rises until the difference between the voltage of the N2 node and the voltage of the N1 node corresponds to the threshold voltage Vth of the driving element. Accordingly, the voltage of the N2 node is VDD+Vth at an ending timing of the sampling period (2). Further, a voltage difference of the N2 node and the N4 node is stored in the capacitor Cs.

During the emission period (4), the pixel driving circuit turns on the T5' transistor to supply the reference voltage Vref to the N4 node. As the voltage of the N4 node is changed, the voltage of the N2 node is VDD+Vth+Vdata-Vref by the coupling of the capacitor Cs. Further, the pixel driving circuit turns on the T9 transistor to apply the low potential voltage VSS to the N3 node and the light emitting diode 130 emits light by the driving current. In this case, a driving current $I_D$ of the driving element is expressed by Equation 1 above.

As described above, the driving current $I_D$ is affected not by the high potential voltage VDD which drops the voltage due to the influence of the current, but by the reference voltage Vref which is hardly affected by the voltage drop by applying a constant voltage. Therefore, the luminance variation depending on the position of the pixel PXL on the display panel may be suppressed.

Further, the driving current ID is affected not by the high potential voltage VDD, but by the reference voltage Vref so that the driving current ID is not affected by the voltage drop of the high potential voltage VDD. Therefore, the luminance variation in accordance with the position of the pixel PXL on the display panel may be suppressed.

The exemplary embodiments of the present disclosure can also be described as follows:

According to an aspect of the present disclosure, there is provided a display panel. The display panel includes a pixel including sub pixels. The pixel further includes a sub pixel area in which the sub pixels are disposed and a common area. The pixel includes a light emitting diode including an anode electrode and a cathode electrode. The anode electrode is electrically connected to a first power line to which a high potential voltage is supplied. Each of the sub pixels includes: a driving element in which a source is connected to a N1 node, a gate is connected to a N2 node, and a drain is connected to a N3 node, a capacitor connected to the N2 node and a N4 node; a N1 switching circuit connected to the N1 node; a N2 switching circuit connected to the N2 node; a N3 switching circuit connected to the N3 node; and a N4 switching circuit connected to the N4 node. The light emitting diode is electrically connected between the first power line and the driving element.

The N4 switching circuit may be disposed in the common area to be electrically connected to at least two sub pixels.

The two or more sub pixels may be connected to each other by means of the N4 node.

The N4 switching circuit may be located in the common area.

The N4 switching circuit may be implemented by transistors controlled by an n−1-th scan signal, an n-th scan signal, and an n-th emission signal.

The N4 switching circuit may be connected to a fourth power line which supplies a reference voltage and a driving current value generated by the driving element while the light emitting diode emits light may be determined based on the reference voltage.

The N1 switching circuit may be implemented to be controlled by an n-th scan signal to supply a data voltage to the N1 node.

The N2 switching circuit may be controlled by an n−1-th scan signal and an n-th scan signal and may be connected to a third power line to which an initialization voltage is supplied to supply the initialization voltage to the N2 node.

The N3 switching circuit may be controlled by a n-th emission signal so that the N3 node is connected to a second power line to which a low potential voltage is supplied.

According to another aspect of the present disclosure, there is provided a display panel. The display panel includes a light emitting diode including an anode and a cathode. The display panel further includes a pixel driving circuit which supplies a driving current to the light emitting diode. The anode is connected to a first power line to which a high potential voltage is supplied. A sub pixel which includes the light emitting diode and the pixel driving circuit further includes: a driving element in which a source is connected to a N1 node, a gate is connected to a N2 node, and a drain is connected to a N3 node, an emission control circuit connected to the anode and the cathode; a capacitor connected to the N2 node and a N4 node; a N2 switching circuit connected to the N2 node; a N3 switching circuit connected to the N3 node; and a N1 switching circuit connected to the N1 node or a N4 switching circuit connected to the N4 node, and the N3 node is electrically connected to a second power line to which a low potential voltage is supplied.

The emission control circuit may be implemented to be controlled by an n−1-th scan signal or an n-th scan signal.

The N2 switching circuit may be implemented to be controlled by an n-th scan signal to conduct the N2 node and the N3 node.

The N2 switching circuit may further include a switching circuit which is controlled by an n−1-th scan signal and is connected to a third power line to which an initialization voltage is supplied.

The N3 switching circuit may be implemented to be controlled by an n-th emission signal to supply low potential voltage to the N3 node.

The N3 switching circuit may further include a switching circuit which is controlled by an n−1-th scan signal and is connected to a fourth power line to which a reference voltage is supplied.

The N1 switching circuit may be implemented to be controlled by an n-th scan signal to supply a data voltage to the N1 node.

The N4 switching circuit may be implemented to be controlled by an n-th scan signal to supply a data voltage to the N4 node.

The N4 switching circuit may further include a switching circuit which is controlled by an n-th emission signal and is connected to a fourth power line to which a reference voltage is supplied.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. Therefore, it should be understood that the above-described exemplary embodiments are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display panel, comprising:

a substrate;

a plurality of pixels on the substrate each including sub pixels; and a gate driver formed directly on the substrate together with the pixels, wherein the pixel includes a light emitting diode including an anode electrode and a cathode electrode, the anode electrode being electrically connected to a first power line to which a high potential voltage is supplied, wherein each of the sub pixels includes:

a driving element in which a source is connected to a N1 node, a gate is connected to a N2 node, and a drain is connected to a N3 node, a capacitor connected to the N2 node and a N4 node;

a N1 switching circuit connected to the N1 node;

a N2 switching circuit connected to the N2 node;

a N3 switching circuit connected to the N3 node; and a N4 switching circuit connected to the N4 node, and wherein the light emitting diode is electrically connected between the first power line and the driving element, and wherein the N4 switching circuit is connected to a fourth power line which supplies a reference voltage, and a driving current value generated by the driving element while the light emitting diode emits light is determined based on the reference voltage.

2. The display panel according to claim 1, wherein the pixel includes a sub pixel area in which the sub pixels are disposed and a common area, and the N4 switching circuit is disposed in the common area to be electrically connected to at least two of the sub pixels.

3. The display panel according to claim 2, wherein two or more of the sub pixels are connected to each other by means of the N4 node.

4. The display panel according to claim 1, wherein the pixel includes a sub pixel area in which the sub pixels are disposed and a common area, the N4 switching circuit is located in the common area.

5. The display panel according to claim 1, wherein the N4 switching circuit is implemented by transistors controlled by an n−1-th scan signal, an n-th scan signal, and an n-th emission signal.

6. The display panel according to claim 1, wherein the N1 switching circuit is controlled by an n-th scan signal to supply a data voltage to the N1 node.

7. The display panel according to claim 1, wherein the N2 switching circuit is controlled by an n−1-th scan signal and an n-th scan signal and is connected to a third power line to which an initialization voltage is supplied to supply the initialization voltage to the N2 node.

8. The display panel according to claim 1, wherein the N3 switching circuit is controlled by a n-th emission signal so that the N3 node is connected to a second power line to which a low potential voltage is supplied.

9. The display panel according to claim 1, wherein the light emitting diode includes inorganic layers.

10. The display panel according to claim 1, wherein the light emitting diode further includes an emission layer including a first semiconductor layer, an active layer on the first semiconductor layer, and a second semiconductor layer on the active layer, the first semiconductor layer is formed of an n-GaN based semiconductor material, the second semiconductor layer is formed of a p-GaN based semiconductor material, the anode electrode is on the second semiconductor layer, and the cathode electrode is on the first semiconductor layer to be electrically isolated from the active layer and the second semiconductor layer.

11. The display panel according to claim 1, wherein at least one of the driving element and the switching circuits included in each of the sub pixels is a P-type transistor.

12. The display panel according to claim 11, wherein at least one transistor included in the gate driver is a P-type transistor.

13. The display panel according to claim 1, wherein the first power line is shared by the light emitting diodes included in all the pixels, and the first power line is implemented by a planar shape with holes or a mesh type plate.

14. The display panel according to claim 13, wherein the cathode electrodes of the light emitting diodes are disposed to be spaced apart from each other for every sub pixel to supply different driving currents for every sub pixel.

15. A display panel, comprising:

a substrate;

a light emitting diode on the substrate and including an anode and a cathode;

a gate driver formed directly on the substrate; and a pixel driving circuit which supplies a driving current to the light emitting diode, wherein the anode is connected to a first power line to which a high potential voltage is supplied, a plurality of sub pixels on the substrate each includes the light emitting diode and the pixel driving circuit, each of the sub pixels further includes:

a driving element in which a source is connected to a N1 node, a gate is connected to a N2 node, and a drain is connected to a N3 node, an emission control circuit connected to the anode and the cathode;

a capacitor connected to the N2 node and a N4 node;

a N2 switching circuit connected to the N2 node;

a N3 switching circuit connected to the N3 node; and a N1 switching circuit connected to the N1 node or a N4 switching circuit connected to the N4 node, and wherein the N3 node is electrically connected to a second power line to which a low potential voltage is supplied, wherein the N3 switching circuit is controlled by an n-th emission signal to supply low potential voltage to the N3 node, and wherein the N3 switching circuit further includes a switching circuit which is controlled by an n−1-th scan signal and is connected to a fourth power line to which a reference voltage is supplied.

16. The display panel according to claim 15, wherein the emission control circuit is controlled by an n−1-th scan signal or an n-th scan signal.

17. The display panel according to claim 15, wherein the N2 switching circuit includes a switching circuit which is controlled by an n-th scan signal to conduct the N2 node and the N3 node.

18. The display panel according to claim 17, wherein the N2 switching circuit further includes a switching circuit which is controlled by an n−1-th scan signal and is connected to a third power line to which an initialization voltage is supplied.

19. The display panel according to claim 15, wherein the N1 switching circuit includes a switching circuit which is controlled by an n-th scan signal to supply a data voltage to the N1 node.

20. The display panel according to claim 19, wherein the N1 switching circuit further includes a switching circuit which is controlled by an n-th emission signal to conduct the N1 node and the N4 node.

21. The display panel according to claim 15, wherein the N4 switching circuit is controlled by an n-th scan signal to supply a data voltage to the N4 node.

22. The display panel according to claim 15, wherein the N4 switching circuit further includes a switching circuit which is controlled by an n-th emission signal and is connected to a fourth power line to which a reference voltage is supplied.

23. The display panel according to claim 15, wherein the light emitting diode includes inorganic layers.

24. The display panel according to claim 15, wherein the light emitting diode further includes an emission layer including a first semiconductor layer, an active layer on the first semiconductor layer, and a second semiconductor layer on the active layer, the first semiconductor layer is formed of an n-GaN based semiconductor material, the second semiconductor layer is formed of a p-GaN based semiconductor material, the anode is on the second semiconductor layer, and the cathode is on the first semiconductor layer to be electrically isolated from the active layer and the second semiconductor layer.

25. The display panel according to claim 15, wherein at least one of the driving element and the switching circuits included in each of the sub pixels is a P-type transistor.

26. The display panel according to claim 25, wherein at least one transistor included in the gate driver is a P-type transistor.

27. The display panel according to claim 15, wherein the first power line is shared by the light emitting diodes included in all the sub pixels, and the first power line is implemented by a planar shape with holes or a mesh type plate.

28. The display panel according to claim 27, wherein the cathodes of the light emitting diodes are disposed to be spaced apart from each other for every sub pixel to supply different driving currents for every sub pixel.

29. The display panel according to claim 15, wherein the N3 switching circuit further includes a switching circuit which is controlled by an n-th emission signal to supply low potential voltage to the N3 node.

* * * * *